United States Patent [19]

Yeh

[11] Patent Number: 5,041,249

[45] Date of Patent: Aug. 20, 1991

[54] PROCESS FOR LOW-TEMPERATURE ELASTOMER FINISHING

[75] Inventor: Richard C. Yeh, Westfield, N.J.

[73] Assignee: Exxon Chemical Patent Inc., Linden, N.J.

[21] Appl. No.: 456,369

[22] Filed: Dec. 26, 1989

[51] Int. Cl.$^5$ .............................................. B29B 9/12
[52] U.S. Cl. ...................... 264/85; 159/2.1; 159/2.2; 264/101; 264/118; 264/141; 264/201; 264/349; 425/203
[58] Field of Search ................. 264/101, 102, 349, 85, 264/201, 141, 118; 425/203, 204, 207; 159/2.1, 2.2

[56] References Cited

U.S. PATENT DOCUMENTS

| | | |
|---|---|---|
| 3,317,959 | 5/1967 | List . |
| 3,333,298 | 8/1967 | List et al. . |
| 3,337,913 | 8/1967 | List . |
| 3,346,242 | 10/1967 | List . |
| 3,347,528 | 10/1967 | List et al. . |
| 3,480,997 | 12/1969 | List . |
| 3,687,422 | 8/1972 | List . |
| 3,689,035 | 9/1972 | List . |
| 3,880,407 | 4/1975 | List . |
| 3,981,658 | 9/1976 | Briggs ........................ 425/208 |
| 4,039,024 | 8/1977 | List . |
| 4,080,352 | 3/1978 | Wallace ....................... 264/349 |
| 4,132,845 | 1/1979 | Covington, Jr. et al. ......... 425/208 |
| 4,239,864 | 12/1980 | Miloscia et al. ............... 264/101 |
| 4,446,094 | 5/1984 | Rossiter ....................... 425/203 |
| 4,485,060 | 11/1984 | Franz et al. .................. 264/349 |
| 4,490,104 | 12/1984 | Lantz .......................... 264/102 |
| 4,508,592 | 4/1985 | Kowalski . |
| 4,575,253 | 3/1986 | List et al. . |
| 4,650,338 | 3/1987 | List et al. . |
| 4,943,402 | 7/1990 | Kafka et al. ................. 264/211.23 |

FOREIGN PATENT DOCUMENTS

| | | |
|---|---|---|
| 105436 | 4/1984 | European Pat. Off. . |
| 0169382 | 1/1986 | European Pat. Off. ............ 264/141 |
| 267531A | 5/1988 | European Pat. Off. . |
| 274668A | 7/1988 | European Pat. Off. . |
| 304925 | 8/1988 | European Pat. Off. . |
| 289647A | 11/1988 | European Pat. Off. . |
| 3704269 | 6/1988 | Fed. Rep. of Germany . |
| 3828895 | 3/1989 | Fed. Rep. of Germany . |
| 52-14666 | 2/1977 | Japan .......................... 264/102 |
| 658798 | 12/1986 | Switzerland . |
| 661450A | 7/1987 | Switzerland . |
| 664704A | 3/1988 | Switzerland . |
| 2200570 | 8/1988 | United Kingdom . |

OTHER PUBLICATIONS

"LIST" AP-Machines, Discotherm B, Discotherm & Paddle Driers.

Primary Examiner—Jeffery Thurlow
Attorney, Agent, or Firm—W. G. Muller

[57] ABSTRACT

A finishing process for water-slurried elastomers wherein a partially dewatered elastomer is presented to an enclosed, low shear, self-cleaning, long residence time dryer for drying at low temperatures in order to remove the remaining water and residual volatiles. The dried product is then cooled in a pneumatic conveyor to temperatures required for baling.

24 Claims, 2 Drawing Sheets

PROCESS FOR LOW-TEMPERATURE ELASTOMER FINISHING

BACKGROUND OF THE INVENTION

1. Field of the Invention

The invention relates generally to a finishing process for elastomeric polymers. More specifically, the invention pertains to a process for the finish drying of a water-slurried elastomer having residual hydrocarbon volatiles wherein an enclosed, self-cleaning, low-shear dryer is utilized to achieve drying temperatures which are significantly lower than those associated with conventional processes.

Conventional finishing processes for water-slurried elastomers involve presenting the water-slurried elastomer to a number of dewatering/drying extruders, usually two or three, whereby the water contained in the elastomer is removed, and then cooling the dried elastomer in a conveyor prior to baling. All of the aforementioned extruders are characterized by short residence times, with the elastomeric material flowing through each of the extruders within 30 seconds to 2 minutes. Examples of extruders of the foregoing type can be found in U.S. Pat. Nos. 4,538,917; 4,484,878; 4,538,917; 4,446,094; 4,383,764; 4,304,054; 4,226,671; 4,185,057; 4,136,251; 4,124,306; 4,063,718; 4,029,300; 3,993,292; 3,908,013; 3,834,440; 3,684,252 and 3,578,740.

Because the residence times for the respective extruders are so short, extensive mechanical shear and very high drying temperatures must be applied in the extruders in order to dry the elastomeric material to the extent required to achieve acceptable water removal. In the last extruder, for example, a drying temperature of 150° C. to 250° C. is necessary to dry the elastomer, with the actual required temperature depending upon the particular type of elastomer and its water content when introduced into the extruder.

The elastomeric material which exits the last drying extruder in crumb form is extremely hot and porous, frequently containing a large amount of fines. Fines are generated as a result of flashing high temperature and high pressure steam from the rubber crumb at the exit of the drying extruder or internally at the vent section. The steam tears apart the rubber crumb and thus generates fines. In order to reduce fines generation, conventional processes reduce temperature and pressure in the drying extruder to avoid the explosion. In the latter case, however, water cannot be removed completely at the drying extruder, and further drying must be provided in vibrating or non-vibrating conveyors. When the hot, dry crumb is supplied to a conveyor for drying and cooling prior to baling, it poses numerous problems detrimental to the finishing process.

Generally, the cooling conveyor consists of a vibrating conveyor such as a fluidized bed conveyor and the like. The hot and porous condition of the elastomeric crumb results in serious fouling and agglomeration problems in the vibrating conveyor. Additionally, the vibrating conveyor is often operated at high temperatures, typically ranging from 90° C. to 130° C., in order to remove additional moisture from the elastomeric crumb, as discussed above. When utilizing high temperatures to achieve further drying, the negative effects of fouling and agglomeration due to the condition of the elastomer are even further intensified.

Other conventional elastomer finishing processes substitute a non-vibrating belt conveyor for the vibrating conveyor. The non-vibrating conveyors, however, experience the same problems and drawbacks associated with the vibrating conveyors. For both the vibrating and non-vibrating conveyor types, the very hot, porous nature of the extruded elastomeric crumb destabilizes and impairs the quality of the finished product, causing discoloration and contamination. Moreover, fouling of the conveyor equipment by the elastomeric material leads to costly and inconvenient downtimes for cleaning of the conveyor and, indeed, is apt to culminate in even costlier repairs and replacement.

Conventional elastomeric finishing processes have also utilized a pneumatic conveyor between the last drying extruder and the heating/cooling vibrating conveyor or non-vibrating belt conveyor. The pneumatic conveyor is susceptible to all of the problems previously discussed in connection with the vibrating and belt conveyors. Additionally, the pneumatic conveyor is subject to the further limitation of undesirable condensation in the conveyor resulting from the high temperature of the elastomeric crumb.

The present invention addresses and overcomes the deficiencies associated with conventional finishing processes for elastomeric materials resulting from the high temperature and porosity of the material when it exits the last drying extruder. The process of the present invention involves drying the elastomeric material in an enclosed, self-cleaning, no-fouling dryer characterized by low shear, long residence times and reduced drying temperatures. According to the invention, the drying is achieved, not by steam flashing, but in a diffusion mechanism, under gentle shear of a dryer agitator and under vacuum. The gentle shear exposes new crumb surface containing the existing internal moisture, and the vacuum accelerates the molecular diffusion of water through the rubber. In this manner, the rubber crumb will not be formed, and high temperature is not necessary. Therefore, fines generation is avoided.

According to the invention, fines are eliminated at the dryer discharge, all of the drying is completed in the dryer, and the elastomer is in a dense crumb or pellet form when it is discharged from the dryer. Thus, the necessity for further drying is removed, and only cooling is required in the downstream conveyor. The dryer may be utilized further to remove residual volatiles from the elastomer. Further in accordance with the invention, the bulk density of the elastomer can be adjusted by injecting a small amount of nitrogen or air or other gases into the discharging screw located at the discharge end of the dryer.

Volatiles are removed from the dryer through a large vent section that is located so as to evacuate liberated volatiles. Compared to conventional processes, the invention provides a concentrated volatile stream from the vent section, undiluted by drying air or nitrogen, and ready to be treated or recovered. By reducing dilution from added gases, the volatile stream is more efficiently processed for emission reduction, thereby providing a significant advantage in reducing emissions. Additionally, the volatile remaining in the product can be as low as about 0.05% by weight and, typically, about 0.10% by weight.

The downstream cooling conveyor may comprise a pneumatic conveyor with a cooling water jacket, absent the concerns and limitations of condensation, fouling and agglomeration. The vibrating conveyor or the non-vibrating belt conveyor may therefore be eliminated.

The invention contemplates utilizing the dryer in replacement of the last drying extruder of conventional elastomeric finishing processes. Alternatively, the dryer may be utilized in addition to, and subsequent to, the final drying extruder. The rubber is discharged from the dryer through a screw/die/cutter arrangement. Pneumatic conveying is preferably introduced at the die/cutter for further cooling. Refrigerated air and a water jacket may be utilized to achieve cooling to baling temperatures. Because no water vapor is present at the latter stage, condensation is avoided. Furthermore, no steam flashing occurs at this stage and, consequently, no fines are generated. The use of refrigerated air and a water jacket serves further to avoid fouling in the pneumatic conveying system.

2. Description of the Prior Art

It is known in the prior art to provide finishing processes for elastomers wherein the elastomer is dried in one or more extruders and further dried and/or cooled in a conveyor. Examples of such extruders are disclosed in U.S. Pat. Nos. 4,538,917; 4,484,878; 4,446,094; 4,383,764; 4,304,054; 4,185,057; 4,136,251; 4,124,306; 4,063,718; 4,029,300; 3,993,292; 3,980,013; 3,834,440; 3,684,252 and 3,578,740.

The prior art also discloses enclosed, self-cleaning, low-shear dryers in the form of a heated mixer-kneader. Such dryers are essentially characterized by a sequence of heated disc elements mounted axially on a rotary shaft. Fixed scraping elements between the discs act to clean the discs and shaft. Embodiments of dryers possessing the latter characteristics are shown in U.S. Pat. Nos. 4,650,338; 4,039,024; 3,880,407; 3,689,035 and 3,687,422.

U.S. Pat. No. 4,650,338, which issued to List

U.S. Pat. No. 4,650,338, which issued to List et al on Mar. 17, 1987, discloses a mixing and kneading machine having a shaft provided with a plurality of discs interconnected by means of a kneading arm. A second more rapidly rotating cleaning shaft cooperates with the first shaft.

U.S. Pat. No. 4,039,024 of Aug. 2, 1977 to List teaches a heat exchanger including a stirring shaft upon which is mounted a plurality of disc elements. A scraper member is secured to and extends outwardly from the shaft. The forward edge of the scraper and the discs are connected by means of a stirrer bar.

U.S. Pat. No. 3,880,407, which issued on Apr. 29, 1975 to List is directed to a mixer and kneader characterized by shaft-mounted agitator elements having stirrer blades secured thereto. A continuous cleaning action is provided by a plurality of counter elements.

U.S. Pat. No. 3,689,035 to List dated Sept. 5, 1972, shows a mixing kneader apparatus wherein disc members are mounted on a stirrer shaft, and kneading bar members are arranged between the disc members. A second stirrer shaft having stirrer arm members serves to clean the disc members of the first shaft. U.S. Pat. No. 3,687,422, which issued to List on Aug. 29, 1972, shows a similar mixing kneader device.

Additionally, Great Britain Patent Number 2,200,570 to List teaches a kneader-mixer which combines discs, mixing bars and counter paddles, as do European Patents 289,647 and 274,668 to List.

The kneading/mixing devices taught by the prior art cited and discussed above are enclosed, self-cleaning devices. The prior art fails to teach or suggest the use of a device of this type as a dryer in an elastomer finishing process to achieve low temperature drying of the elastomer under low shear conditions, and to remove residual volatiles and fines.

SUMMARY OF THE INVENTION

The invention relates to a finishing process for water-slurried elastomers. According to the principles of the invention, a partially dewatered elastomer slurry is presented to an enclosed self-cleaning, low shear dryer characterized by long residence time. The elastomer slurry is dried in the dryer at a relatively low temperature to remove the remaining moisture. Steam produced during drying is removed from the dryer, as are residual hydrocarbon volatiles which may be present in the elastomer.

Fines are removed at the discharge end of the dryer. The product obtained from the dryer is a relatively low temperature rubber in dense crumb or pellet form with adjustable bulk density. The product is then directed to a pneumatic conveyor for cooling to baling temperatures and, thereafter, may be directly packaged into bags.

DESCRIPTION OF THE PREFERRED EMBODIMENT

Figure 1:
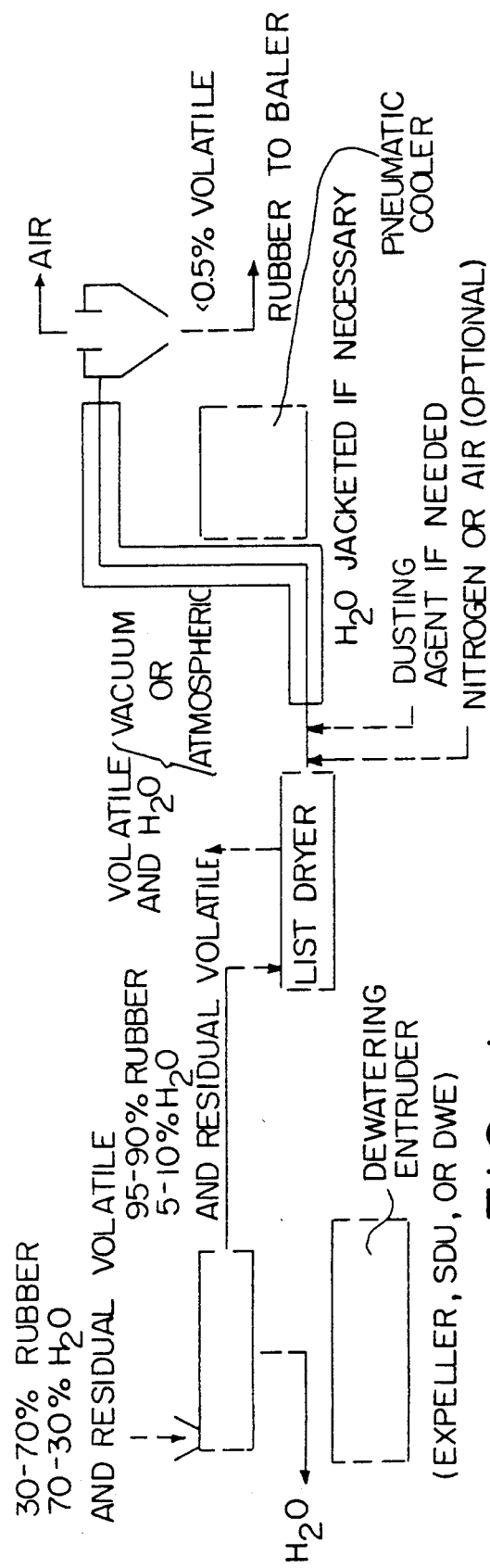
FIG. 1 illustrates schematically a first embodiment for the process of the present invention.

A first embodiment for the invention is illustrated in FIG. 1, which shows schematically a finishing process for elastomers according to the principles of the present invention. As shown therein, a water-slurried elastomer is introduced to a dewatering extruder. The elastomer consists of a rubber slurry, which may have been subjected to previous drying in upstream extruders. The rubber slurry presented to the extruder of FIG. 1 generally is made up of 30–70% rubber, 70–30% water, plus residual hydrocarbon volatiles. The rubber is dried in the extruder, and excess water is removed, so as to obtain a dewatered composition for the slurry of around 95–90% rubber, 5–10% water, plus the residual volatiles.

According to conventional finishing processes and methods, the dewatered elastomer would then be presented to a final dewatering extruder to remove the remaining water. Because all of the extruders utilized in conventional processes are short residence time machines, with all of the elastomer flowing through within 30 seconds to two minutes, high temperatures are required in the extruders to dry the rubber. In particular, drying temperatures of 150° C. to 250° C. are required in the final extruder in order to remove the remaining water. As discussed herein, these high temperatures create a very hot and porous product, which causes fouling and agglomeration problems in downstream equipment, and which adversely affects the quality of the final product. Additionally, the short residence time drying processes presented by conventional prior art finishing methods are unable to remove residual hydrocarbon volatiles, such as hexane, ENB and oligomers, in absence of high temperatures and product degradation.

Flashing high temperature and high pressure steam from the rubber crumb at the exit of the drying extruder, or internally at the vent section, results in the generation of fines due to steam tearing apart the rubber crumb. Conventional processes attempt to reduce fines generation by reducing the temperature and pressure in the drying extruder in an effort to avoid the aforementioned explosion. This temperature and pressure reduction, however, means that water cannot be removed completely at the drying extruder, and further drying must be obtained in vibrating or non-vibrating conveyors.

In a departure from conventional processes, the process of the present invention involves feeding partially dewatered elastomer to an enclosed, high residence time, low-shear, self-cleaning dryer. Dryers of this type are manufactured by LIST AG, a corporation of Switzerland, and comprise the subject matter of several U.S. and foreign patents, including U.S. Pat. Nos. 4,650,338; 4,039,024; 3,880,407; 3,689,035; 3,687,422 and 2,200,570, as well as Great Britain Patent 2,200,570 and European Patent Numbers 289,647 and 274,668.

The LIST dryers are, in general, heated mixer-kneaders including a sequence of heated disc elements mounted axially on a rotary shaft in an enclosed housing. Scraping elements between the discs serve to clean the discs and the shaft. The significant features of the List dryer as it pertains to the present invention is that it is self cleaning, and provides longer retention times and low shear.

Thus, as shown in FIG. 1, the dewatered elastomer, being around 95-90% rubber, 5-10% water, and including residual volatiles, is taken from the dewatering extruder and supplied to the dryer. The dryer may be operated under atmospheric or vacuum conditions. Preferably, the dryer is either the DPB or AP CONTI models manufactured by LIST AG. The residence time for the elastomer in the dryer is 3 minutes to 30 minutes, significantly longer than the 30 seconds to 2 minute range for the dewatering extruders. Consequently, the dryer permits a significant reduction in drying temperatures below those required in conventional finishing processes. In particular, drying temperatures in the dryer sufficient to remove all of the water from the partially dewatered elastomer are 130° C. and less, as compared with a 150° C. to 250° C. drying temperature range for the extruders. Actual results indicate that the drying temperature for the dryer may be reduced to 90° C. under vacuum, or 120° C. at atmospheric conditions, thereby providing a low temperature drying process.

According to the invention, drying is achieved in a diffusion mechanism, under gentle shear of the dryer agitator and, preferably, under vacuum. The gentle shear exposes new crumb surfaces of the elastomer which contain internal moisture and the vacuum accelerates the molecular diffusion of water through the rubber. In this manner, the rubber crumb will not be formed, and high temperatures are not required. Fines generation, furthermore, is avoided.

The enclosed dryer allows for the containment and removal of the residual hydrocarbon volatiles contained in the elastomer, in contrast to the conventional short residence time atmospheric drying processes wherein the removal of residuals is generally not accomplished successfully. Volatiles are removed from the dryer through a large vent section that is located so as to evacuate liberated volatiles without dilution by drying air or nitrogen. Thus, the invention obtains a concentrated volatile stream from the vent section which, in the absence of added gases, is relatively undiluted and therefore more efficiently processed for emissions reduction. The volatile remaining in the product can be as low as about 0.01% by weight and, typically, 0.05% by weight. Steam produced during drying may also be easily removed from the enclosed dryer, as by suitable connections mounted on the dryer housing.

The elastomer discharge from the dryer is in a dense crumb or pellet form, and fines are eliminated at the dryer discharge. Thus, in addition to the fact that the product exiting the dryer is much lower in temperature than the conventional final dewatering extruder, the form of the product is also superior to that produced by the last extruder. The crumb which exits the final extruder in conventional processes is very hot and porous, and contains a large amount of fines. In contrast, the elastomer discharged from the dryer is relatively cool, dense, and contains little, if any, fines. The fact that fines are minimized in the drying step according to the present invention avoids the numerous problems of equipment fouling, product discoloration and product quality degradation due to the presence of fines in prior art finishing processes. Moreover, the low temperature and greater density of the rubber produced in the dryer eliminates the fouling and agglomeration problems of conventional methods in downstream equipment. The dryer utilized in the instant process is self-cleaning, and itself resists fouling.

Because all of the required drying is realized in the dryer, no additional drying need be carried out downstream. The downstream vibrating and non-vibrating drying conveyors associated with known finishing processes may therefore be eliminated in the process of the instant invention. The rubber is discharged from the dryer through a screw/die/cutter arrangement. Pneumatic conveying is preferably introduced at the die/cutter for further cooling. Thus, it can be seen in FIG. 1 that the rubber discharged from the dryer is directed to a downstream pneumatic conveyor for cooling. A dusting of anti-tack particles can be directly introduced into the pneumatic cooler. The pneumatic conveyor may be provided with a cooling water jacket, and refrigerated air may be employed to achieve the necessary pre-baling cooling and to avoid fouling in the pneumatic conveying system. The relatively low temperature of the rubber minimizes the possibility of condensation in the pneumatic conveyor, as no water vapor is present at this stage, thereby eliminating the limitations and problems attendant to condensation in conventional methods. Furthermore, no steam flashing occurs at this stage and, consequently, no fines are generated. Indeed, the pneumatic conveyor may be utilized to cool the rubber to baling temperatures directly, without concern for moisture condensation, and without fouling or product agglomeration and/or degradation. The product may be cooled in the pneumatic conveyor and directly packaged into bags, as shown in FIG. 1 where the rubber is directed from the pneumatic cooler to a baler.

The bulk density of the rubber pellet can be adjusted by injecting a small amount of nitrogen or air or other gases into the discharging screw located at the discharge end of the dryer. Nitrogen is preferable to air to avoid some product degradation or crosslinking that may occur due to the presence of oxygen. The nitrogen, or air, serves to create small bubbles or voids inside the rubber pellets, thereby producing lower bulk density pellets. The latter feature is frequently desirable for improved processability, for example, mixing, kneading, dispersing, etc. Moreover, low bulk density pellets can be packaged directly, with some dusting agents being introduced into the pneumatic conveying tube to prevent pellet agglomeration. Dusting agents can be any of those known in the art, including high density PE powder, CaSt$_2$ powders and silicate powders.

A further advantage provided for by the low temperature drying process of the invention relates to the improved product which is obtained from thermally unstable polymers, such as high FNB ethylene propylene rubbers, halobutyls, etc. The reduced temperatures of the present drying process overcomes the product instabilities presented by the high temperatures of drying extruders for thermally sensitive polymers.

Figure 2:
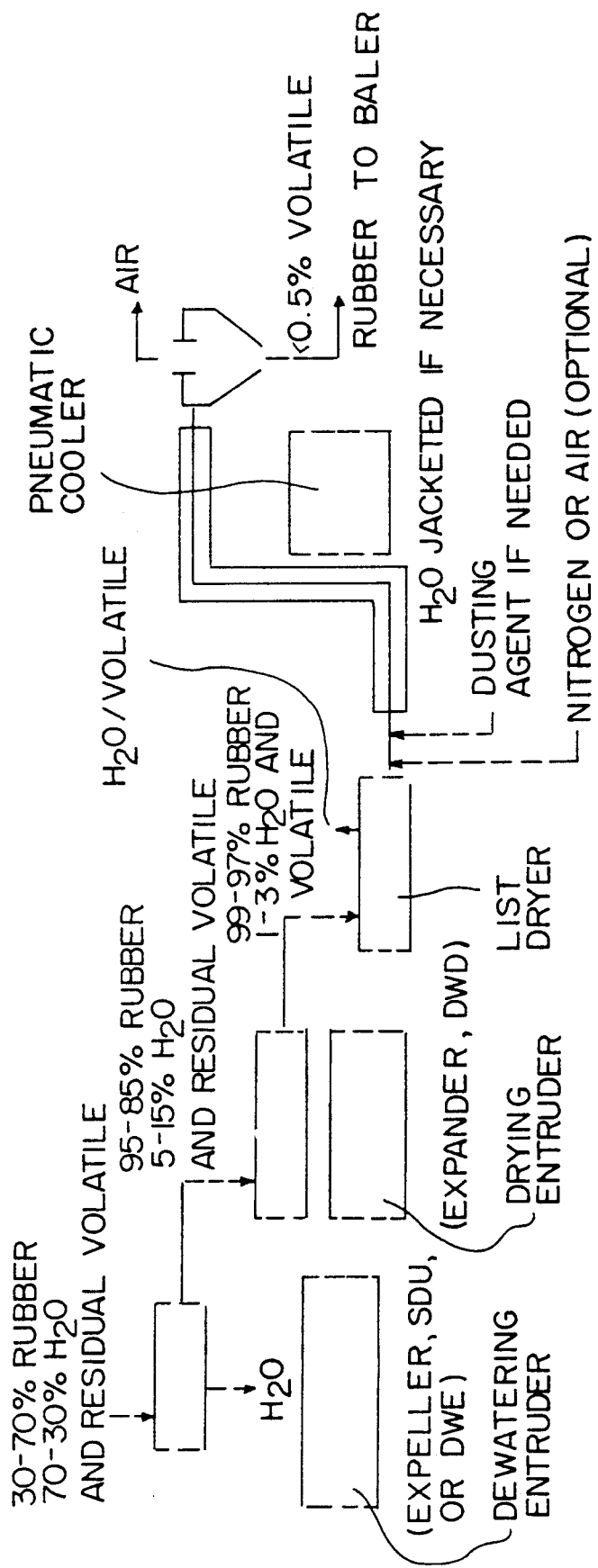
FIG. 2 illustrates schematically an alternative embodiment for the process of the present invention.

A second embodiment for the present invention is depicted schematically in FIG. 2. The process of FIG. 2 differs from the process described in connection with FIG. 1 in that the partially dewatered elastomer is dried in a drying extruder prior to being presented to the LIST dryer. With reference to FIG. 2, it can be seen that the rubber slurry, composed of 30-70% rubber, 70-30% water, plus residual volatiles, is presented for water removal to the dewatering extruder. The product obtained therefrom, consisting of 95-85% rubber, 5-15% water, plus the residual volatiles, is then supplied to a drying extruder. The temperature in the drying extruder is around 120° C. to 160° C., as compared with the 150° C. to 250° C. temperature range for the final drying extruder in conventional processes. The embodiment of FIG. 2 thus allows the extruder temperature to be lowered, so as to obtain a cooler and denser product with its associated benefits.

Following the drying extruder, the rubber product is supplied to the LIST dryer, being around 99-97% rubber, 1-3% water, and containing residual volatiles. Complete drying occurs in the dryer at temperatures less than or equal to 130° C., volatiles are removed, and fines are eliminated at the dryer discharge as discussed in connection with the process of FIG. 1. Residence time in the dryer is 3 minutes to 30 minutes. The dried rubber is then directed to the pneumatic cooler, and then the baler, as was described in conjunction with the first embodiment.

Although the present invention has been described in conjunction with several embodiments, it is to be understood that various modifications, additions and substitutions may be made to the invention described herein without departing from the spirit and scope of the invention as defined in the appended claims.

What is claimed is:

1. A finishing process for water-slurried elastomer containing moisture comprising the steps of
    extruding the water-slurried elastomer to obtain a partially dewatered elastomer containing five to ten percent by weight moisture;
    transferring the partially dewatered elastomer to an enclosed, self-cleaning, low-shear, heated dryer;
    maintaining the partially dewatered elastomer in said dryer for at least three minutes; and
    drying the partially dewatered elastomer in said dryer at a temperature of one hundred thirty degrees Centigrade or less to remove substantially all of the moisture contained in the partially dewatered elastomer.

2. A finishing process as recited in claim 1 wherein the partially dewatered elastomer is maintained in said dryer for three minutes to thirty minutes.

3. A finishing process as recited in claim 2 further including the step of agitating the partially dewatered elastomer in said dryer to continuously expose surfaces of the partially dewatered elastomer.

4. A finishing process as recited in claim 3 wherein the partially dewatered elastomer is dried at a temperature of approximately one hundred twenty degrees Centigrade.

5. A finishing process as recited in claim 3 further including the step of producing a vacuum in said dryer to diffuse moisture through the partially dewatered elastomer.

6. A finishing process as recited in claim 5 wherein the partially dewatered elastomer is dried at a temperature of approximately ninety degrees Centigrade.

7. A finishing process as recited in claim 3 wherein the partially dewatered elastomer contains residual volatiles and the process further includes the step of venting residual volatiles from said dryer.

8. A finishing process as recited in claim 1 further comprising the step of injecting nitrogen into the dried elastomer to reduce the bulk density of the dried elastomer.

9. A finishing process as recited in claim 1 further comprising the step of injecting air into the dried elastomer to reduce the bulk density of the dried elastomer.

10. A finishing process as recited in claim 1 wherein the dried elastomer is in the form of dense crumb.

11. A finishing process as recited in claim 1 wherein the dried elastomer is in the form of pellets.

12. A finishing process as recited in claim 7 further including the step of transferring the dried elastomer from said dryer to a pneumatic conveyor to cool the dried elastomer.

13. A finishing process for water-slurried rubber containing thirty to seventy percent by weight rubber, seventy to thirty percent by weight water and residual volatiles, comprising the steps of
    extruding the water-slurried rubber in a dewatering extruder to obtain a partially dewatered rubber containing five to fifteen percent by weight water and residual volatiles;
    transferring the partially dewatered rubber to an enclosed, self-cleaning, low-shear dryer having heated disc elements axially mounted on a rotatable shaft;
    agitating the partially dewatered rubber with said heated disc elements to continuously expose surfaces of the partially dewatered rubber;
    maintaining the partially dewatered rubber in said dryer for three minutes to thirty minutes;
    venting residual volatiles from the partially dewatered rubber in said dryer; and
    drying the partially dewatered rubber in said dryer at a temperature of one hundred thirty degrees centigrade or less to remove the remaining water from the partially dewatered rubber and obtain a dried rubber containing approximately five one-hundredths percent by weight volatiles.

14. A finishing process as recited in claim 13 further including the step of extruding the partially dewatered rubber in a drying extruder at a temperature of one hundred twenty to one hundred sixty degrees Centigrade prior to transferring the partially dewatered rubber to said dryer.

15. A finishing process as recited in claim 13 wherein said drying is conducted under atmospheric pressure.

16. A finishing process as recited in claim 15 wherein said drying is conducted at around one hundred twenty degrees Centigrade.

17. A finishing process as recited in claim 13 wherein said drying is conducted under vacuum.

18. A finishing process as recited in claim 17 wherein said drying is conducted at around ninety degrees Centigrade.

19. A finishing process as recited in claim 13 further comprising the step of transferring the dried rubber to a pneumatic conveyor to cool the dried rubber, wherein said pneumatic conveyor is provided with a cooling water jacket.

20. A finishing process as recited in claim 19 wherein the dried rubber is cooled to baling temperature in said pneumatic conveyor.

21. A finishing process as recited in claim 20 further comprising the step of packaging the dried rubber after said cooling.

22. A finishing process as recited in claim 19 further comprising the step of introducing a dusting agent into said pneumatic conveyor to prevent agglomeration of the dried rubber.

23. A finishing process as recited in claim 13 further comprising the step of injecting nitrogen into the dried rubber to reduce the bulk density of the dried rubber.

24. A finishing process as recited in claim 13 further comprising the step of injecting air into the dried rubber to reduce the bulk density of the dried rubber.

* * * * *